United States Patent
Hyde et al.

(10) Patent No.: US 9,759,839 B2
(45) Date of Patent: Sep. 12, 2017

(54) PHOTONIC BAND GAP STRUCTURE WITH SUB-WAVELENGTH SCATTERING ELEMENTS

(71) Applicant: Elwha LLC, Bellevue, WA (US)

(72) Inventors: Roderick A. Hyde, Redmond, WA (US); Yaroslav A. Urzhumov, Bellevue, WA (US)

(73) Assignee: Elwha LLC

( * ) Notice: Subject to any disclaimer, the term of this patent is extended or adjusted under 35 U.S.C. 154(b) by 274 days.

(21) Appl. No.: 14/306,876

(22) Filed: Jun. 17, 2014

(65) Prior Publication Data

US 2015/0362625 A1 Dec. 17, 2015

(51) Int. Cl.
  *G02F 1/09* (2006.01)
  *G02B 1/00* (2006.01)
  *G02B 26/00* (2006.01)
  *H01Q 15/00* (2006.01)

(52) U.S. Cl.
  CPC ........... *G02B 1/005* (2013.01); *G02B 26/002* (2013.01); *H01Q 15/0086* (2013.01)

(58) Field of Classification Search
  CPC ...... G02B 26/002; G02B 1/002; G02B 1/005; G02B 1/007; H01Q 15/0086
  USPC .................................. 359/280, 282, 332, 359
  See application file for complete search history.

(56) References Cited

U.S. PATENT DOCUMENTS

| | | | | |
|---|---|---|---|---|
| 7,525,711 B1* | 4/2009 | Rule | ...................... | B82Y 20/00 333/235 |
| 7,580,604 B2* | 8/2009 | D'Aguanno | ........... | B82Y 20/00 359/321 |
| 7,903,246 B2* | 3/2011 | Dal Negro | ............. | B82Y 20/00 356/244 |
| 2010/0027102 A1* | 2/2010 | Hyde | ................. | H01Q 15/0086 359/333 |
| 2010/0253997 A1* | 10/2010 | Li | ........................... | G02F 1/292 359/319 |
| 2012/0105970 A1* | 5/2012 | Ueda | ...................... | G02B 1/002 359/642 |

OTHER PUBLICATIONS

L. Dal Negro, M. Stolfi, Y. Yi, J. Michel, X. Duan, L. C. Kimerling, J. LeBlanc, and J. Haavisto. Photon band gap properties and omnidirectional reflectance in Si/Si O 2 Thue-Morse quasicrystals. Applied Physics Letters 84, 5186 (2004).*
R. A. Shelby, D. R. Smith, S. C. Nemat-Nasser, and S. Schultz. Microwave transmission through a two-dimensional, isotropic, left-handed metamaterial. Applied Physics Letters, vol. 78, No. 4 Jan. 22, 2001.*

(Continued)

*Primary Examiner* — Bumsuk Won
*Assistant Examiner* — Collin X Beatty (57) ABSTRACT

A structure includes a first material, the first material including an artificially structured array of elements, the first material further being arranged in a pattern to at least partially form a photonic band gap in a band gap frequency range. The first material has an effective permeability or an effective permittivity in the band gap frequency range that is determined at least partially by the elements in the array.

51 Claims, 5 Drawing Sheets

(56) References Cited

OTHER PUBLICATIONS

Stanley P. Burgos, Rene de Waele, Albert Polman and Harry A. Atwater. A single-layer wide-angle negative-index metamaterial at visible frequencies. Nature Materials | vol. 9 | May 2010.*
Jun Kamiya, Kenichi Shirota, Takahiro Yagi, Tetsuo Nakazawa. Study of EBG Structures using Metamaterial Technology. OKI Technical Review Apr. 2012 / Issue 219 vol. 79 No. 1.*
Xiaobing Cai and Gengkai Hu. Electromagnetic Absorption by Metamaterial Grating System. Piers Online, vol. 4, No. 1, 2008.*
Jason Valentine, Shuang Zhang, Thomas Zentgraf, Erick Ulin-Avila, Dentcho A. Genov, Guy Bartal & Xiang Zhang. Three-dimensional optical metamaterial with a negative refractive index. Nature Letters vol. 455 Sep. 18, 2008.*
Elena Saenz, Pekka M.T. Ikonen, Ramon Gonzalo, and Sergei A. Tretyakov. On the definition of effective permittivity and permeability for thin composite layers. arXiv:physics/0703119v1. Mar. 11, 2007.*
D. R. Smith, S. Schultz, P. Markos, and C. M. Soukoulis. Determination of effective permittivity and permeability of metamaterials from reflection and transmission coefficients. Physical Review B, vol. 65, 195104. © 2002 The American Physical Society.*
Andrew A. Houck, Jeffrey B. Brock, and Isaac L. Chuang. Experimental Observations of a Left-Handed Material That Obeys Snell's Law. Physical Review Letters vol. 90, No. 13 p. 137401-1-137401-4.*
Andrei Andryieuski, Radu Malureanu, Andrei Lavrinenko. Nested structures approach in designin an isotropic negative-index material for infrared. Journal of the European Optical Society—Rapid Publications 4, 09003 (2009).*
Landy et al.; "Perfect Metamaterial Absorber"; Physical Review Letters; May 23, 2008; pp. 207402-1-207402-4; vol. 100; The American Physical Society.
Larouche et al.; "Infrared metamaterial phase holograms"; Nature Materials; May 2012; pp. 450-454; vol. 11.
Lipworth et al.; "Magnetic Metamaterial Superlens for Increased Range Wireless Power Transfer"; Scientific Reports; bearing a date of Jan. 10, 2014; pp. 1-6; vol. 4.
NKT Photonics; "Supercontinuum Generation in Photonics Crystal Fibers"; Jul. 2009; pp. 1-10; NKT Photonics; Birkerod Denmark.
Smith et al.; "Gradient index metamaterials"; Physical Review E.; bearing a date of Mar. 17, 2005; pp. 036609-1-036609-6; vol. 71; The American Physical Society.
Pendry, J.B. et al.; "Extremely Low Frequency Plasmons in Metallic Mesostructures"; Physical Review; Jun. 17, 1996; pp. 4773-4776; vol. 76, No. 25; The American Physical Society, 1996.
Pendry, J. B. et al.; "Magnetism from Conductors and Enhanced Nonlinear Phenomena"; IEEE Transactions on Microwave Theory and Techniques; Nov. 1999; pp. 2075-2084; vol. 47, No. 11; IEEE; 1999.
Pawlak, Dorota A.; "Metamaterials and photonic crystals-potential applications for self-organized eutectic micro- and nanostructures"; Scientia Plena; bearing a date of 2008; pp. 1-11; vol. 4, No. 1; www.scientiaplena.org.br; Poland.

* cited by examiner

PHOTONIC BAND GAP STRUCTURE WITH SUB-WAVELENGTH SCATTERING ELEMENTS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

PRIORITY APPLICATIONS

None.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

In one embodiment, an apparatus comprises: a structure including a first material, the first material including an artificially structured array of elements, the first material further being arranged in a pattern to at least partially form a photonic band gap in a band gap frequency range; and wherein the first material has an effective permeability or an effective permittivity in the band gap frequency range that is determined at least partially by the elements in the array.

In another embodiment, a method comprises: arranging a first set of elements in a first array to produce a first material having a first effective permittivity or a first effective permeability in an operating frequency range; and arranging the first material in a pattern to at least partially form a photonic band gap in a band gap frequency range, wherein the band gap frequency range overlaps at least in part with the operating frequency range.

In another embodiment, an apparatus comprises: an array of metamaterial elements arranged to form a photonic crystal, the photonic crystal having a band gap in a band gap frequency range.

In another embodiment, a method comprises: interacting electromagnetic energy with a first set of elements, wherein the first set of elements provide an effective permittivity or an effective permeability to the electromagnetic energy; and directing the electromagnetic energy according to a photonic band gap formed by the set of elements.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1:
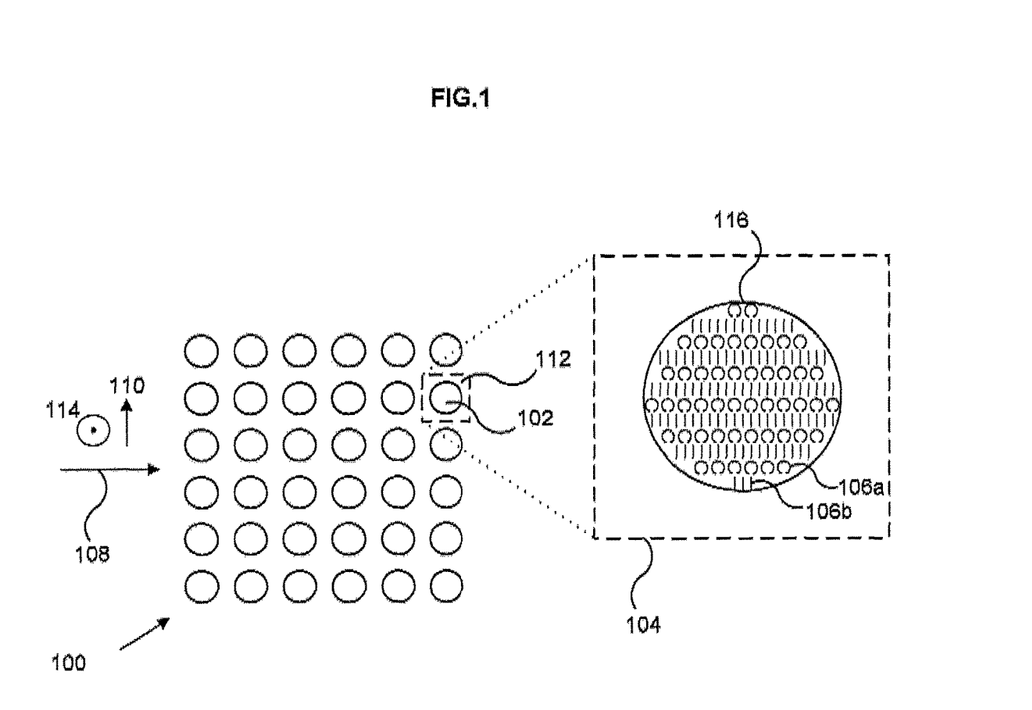
FIG. 1 is a top view schematic of a photonic band gap structure having sub-wavelength elements.

FIG. 1 shows a top view of a structure 100 including a first material 102 that is arranged in a pattern to at least partially form a photonic band gap. The structure 100 having a photonic band gap may also be called a photonic band gap material or a photonic crystal. Generally speaking, photonic band gap materials have the property of preventing electromagnetic radiation having some range of frequencies (the band gap frequency range) from propagating along a given direction in a material. A polarization-selective band gap material may inhibit propagation for select polarizations. Another property of a band gap material is the reduced photonic density of states, a quantum-electrodynamic property of structures and media that influences spontaneous emission rates and other quantum-mechanical transition rates in quantum systems (atoms, molecules and nanoclusters).

The photonic band gap material may be characterized by periodicity of dielectric properties in one, two or three dimensions that gives rise to the band gap behavior. The periodicity may be formed via one or more of a square lattice structure, a triangular lattice structure, a hexagonal lattice structure, a Kagome structure, a graphite structure, a woodpile structure, an opal structure, an inverse opal structure, or a Bragg stack, to name some of the possibilities.

FIG. 1 also serves as an illustration of a photonic crystal structure 100 with enhanced linear dispersion properties at frequencies where the structure 100 supports wave propagation (propagation bands). Dispersion properties that can depend on the effective medium properties of the constituent elements include the phase and the group velocity in any particular propagation direction, and their dependence on the frequency.

Photonic crystals can also be characterized by their nonlinear optical coefficients, including $\chi^{(2)}$ and $\chi^{(3)}$, which can affect electromagnetic wave propagation at higher energy densities. While nonlinear optical coefficients can be negligibly small in naturally occurring dielectric media, they can be increased by the insertion and optimized placement of metallic elements, such as 106a and 106b.

FIG. 1 further shows a close-up of a unit cell 104, which shows the first material 102 including an artificially structured array of elements 106a, 106b, wherein the first material 102 has an effective dielectric permittivity, an effective magnetic permeability, and an effective magnetoelectric susceptibility determined at least partially by the elements 106a, 106b. Such a material 102 having an artificially structured array of elements 106a, 106b, and having an effective permittivity, an effective permeability, and/or an effective magnetoelectric susceptibility determined at least partially by the elements 106a, 106b, may be defined as a metamaterial.

Generally, the effective permittivity, permeability, and/or magnetoelectric susceptibility provided by a material having an artificially structured array of elements can be engineered in a wide range. For example, the real part of the effective permittivity and/or effective permeability of the material can be less than unity, and can be negative. Further, in some embodiments the effective permittivity and/or effective permeability may be higher than what is available with a bulk material (such as a crystalline, polycrystalline, or amorphous dielectric) in a given frequency range.

For a structure having a photonic band gap, the band gap frequency range is affected by the ratio of the effective permittivity (permeability) of the two materials 102 and 112. Thus, engineering these properties enables greater control over band gap frequency ranges, and specifically it allows for engineering of wider band gap frequency ranges than would be available with only bulk materials.

In the embodiment shown in FIG. 1, the elements 106a, 106b are a split-ring resonator and a straight electrical conductor, respectively. These elements and their orientations are selected to provide an effective permeability and permittivity for an electromagnetic wave having a direction 108, electric field 110, and magnetic field 112 as shown in FIG. 1. The close-up of the unit cell 104 shows the elements 106a, 106b on one layer 116 of a multi-layer structure 118 (shown in FIG. 2), where each layer 116 of the multi-layer structure 118 has the elements 106a, 106b patterned on it. The spacing 117 of the layers 116 and the number of layers 116 are selected to provide a spacing 117 between elements in adjacent layers 116 that is small in comparison with the operational wavelength of the device, such that an incoming wave sees the material 102 as a bulk material. For example, the spacing 117 between the layers may be one fifth or one tenth of the free space wavelength corresponding to a frequency in the band gap frequency range. These are exemplary spacings and are not meant to be limiting. However, generally the spacing would be less than a free-space wavelength corresponding to a frequency in the band gap frequency range, with a smaller spacing allowing a better approximation of a bulk material by the artificially structured array.

Figure 2:
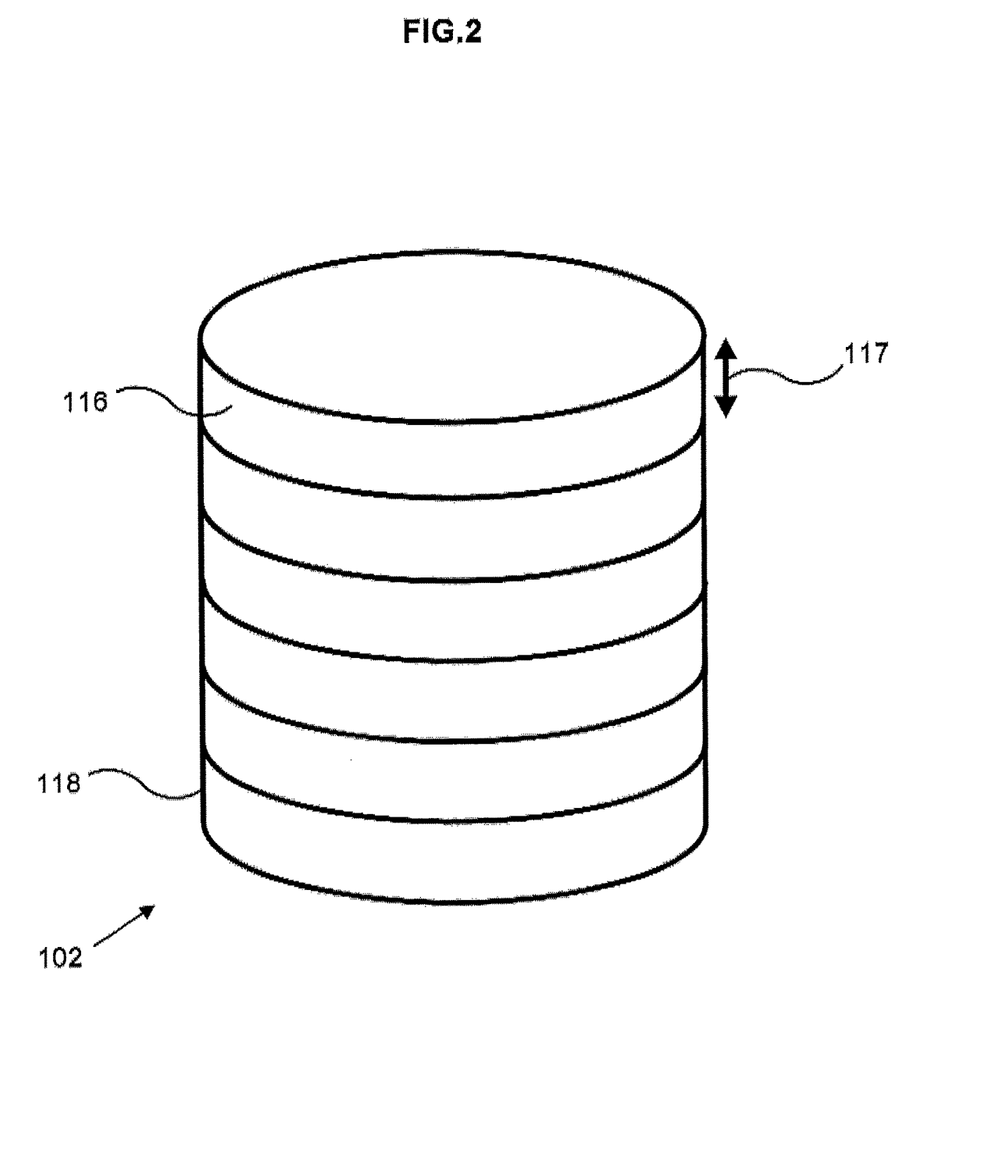
FIG. 2 is a side view of a portion of the photonic band gap structure of FIG. 1.

The fabrication of the multilayer structure 118 can be done in a number of ways. In one embodiment, the elements 106a, 106b are metal elements on circuit board, and are fabricated according to circuit board fabrication technologies. The circuit boards can then be stacked, either directly, with solid spacers such as dielectric slabs, with spacers such as dielectric beads separating adjacent layers 116, or in another way. Metallic elements in different planes can be connected by vias (an example of this 330 is shown in FIG. 3, where elements 332 in different planes are connected by a via 334).

In some embodiments, the elements 106a, 106b are fabricated using optical nanolithography, such as extreme-ultraviolet (EUV) lithography, focused ion beam (FIB) lithography or electron-beam direct-write (EBDW) lithography. In lithographic approaches, one layer can be patterned at a time. In some embodiments, after patterning a layer, the layer is coated with a substrate suitable for patterning of the next layer.

Figure 3:
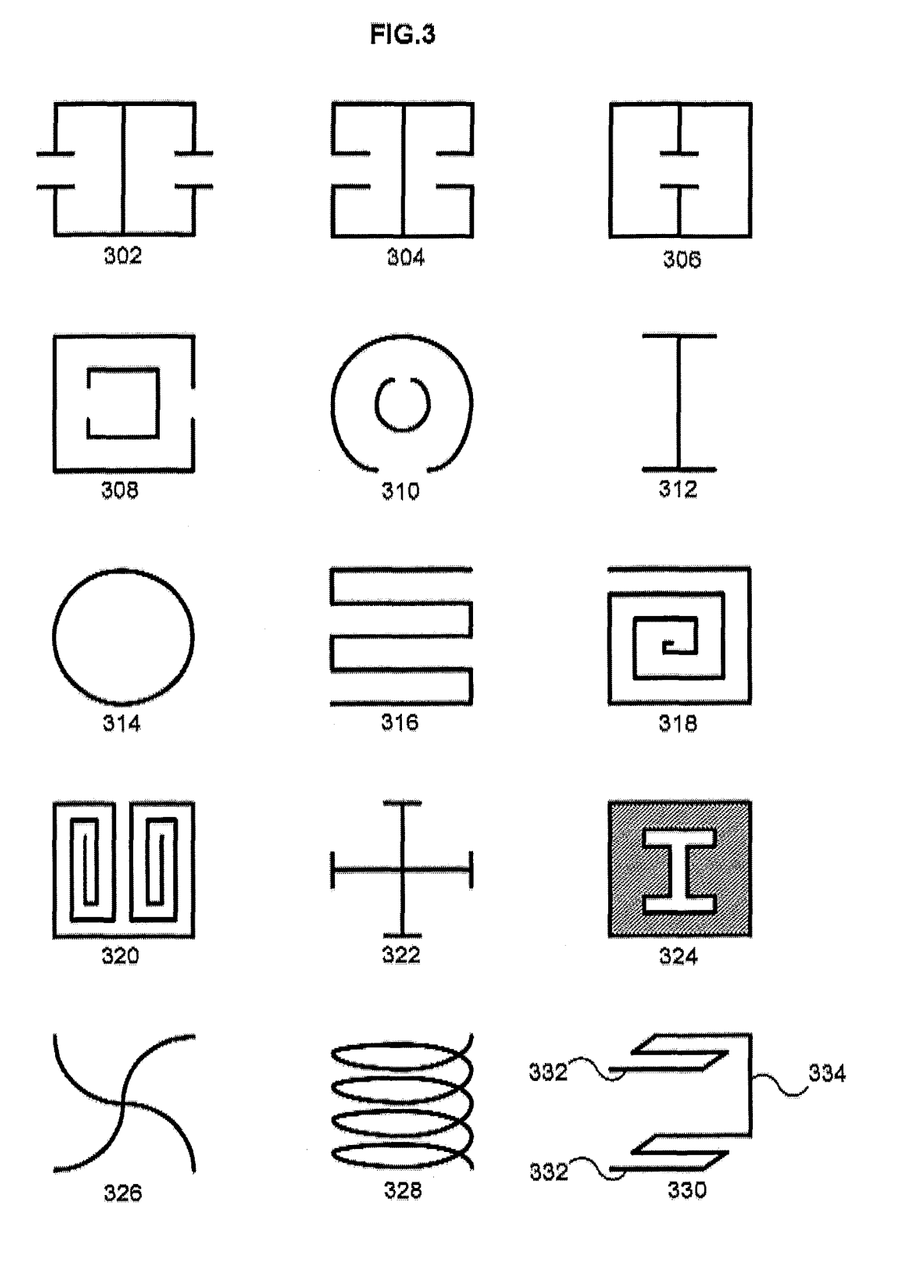
FIG. 3 shows examples of metamaterial elements.

In some embodiments, non-planar elements, such as helixes 328 in FIG. 3, are fabricated by additive manufacturing techniques, such as direct metal laser sintering (DMLS), selective laser sintering (SLS), selective laser melting (SLM) or electron beam free-form fabrication (EBF3). Eutectic metals, metal clay and low melting point metals, including gallium, mercury and their alloys, can be used to fabricate the metallic components using Fused Deposition Modeling (FDM).

In some embodiments, the elements are fabricated using bottom-up approaches, from colloidal solutions of metallic micro- or nanoparticles, which can then self-assemble to form regular, quasi-regular or random arrays. Particles may be subject to electrostatic, magnetostatic, electromagnetic or optical fields to facilitate the assembly process. Particles can include materials with electromagnetic properties that increase their interaction with electromagnetic fields, such as high magnetic permeability, high dielectric constant or negative permittivity.

The elements 106a, 106b are selected to provide an effective permeability (for the split-ring resonators 106a) and an effective permittivity (for the conducting wires 106b) for an incoming electromagnetic wave. Some embodiments may include only an element that provides an effective permeability, such as the split-ring resonator 106a. Other embodiments may include only an element that provides an effective permittivity, such as the conducting wire 106b.

FIG. 1 shows the structure 100 as including just one material 102, where the second material 112 is air, however in other embodiments a unit cell 104 of the structure 100 having a photonic band gap may include different materials than those shown. For example, in some embodiments the second material 112 is a dielectric, or in some embodiments it is another material comprising an artificially structured array of elements (i.e., another metamaterial). Further, in some embodiments the unit cell 104 includes three or more different materials.

Although FIG. 1 shows the material 102 as having elements 106a, 106b that provide an effective permeability (106a) and an effective permittivity (106b), in other embodiments the material 102 may include only elements providing an effective permeability (106a) or the material may include only elements providing an effective permittivity (106b).

FIG. 1 shows a structure 100 having a photonic band gap for just one direction 108 of incident electromagnetic energy and one polarization 110, 114. Other embodiments may be configured to provide a photonic band gap for more than one incident direction 108 and/or polarization 110, 114 of incident electromagnetic energy.

FIG. 3 depicts a variety of metamaterial elements (302-330) (i.e., sub-wavelength scattering elements) that may be used in accordance with various embodiments of a structure having a photonic band gap. These are schematic depictions of exemplary embodiments, not drawn to scale, and intended to be merely representative of a broad variety of possible metamaterial elements suitable for various embodiments. Elements 302-310 are examples of resonant metamaterial elements and elements 312-314, 322-328 are examples of non-resonant metamaterial elements. Although elements 302-326 are substantially 2D, in other embodiments the element(s) may be three-dimensional, as is the case of a 3D spiral (328), elements 332 coupled with a via 334 to form the 3D element 330, or another element whose shape varies along three orthogonal axes. Elements may be selected according to their permittivity, permeability, and/or for their magnetoelectric coupling. Elements 302-306, 312, 316, 320-322 and 330 are examples of elements that may be selected for their effective permittivity, and elements 308-310, 314, 318 and 324 are examples of elements that may be selected for their magnetic-permeability. Elements that provide magnetoelectric susceptibility include, for example, gammadion structures (326) and helical elements (328). The latter elements (328), being non-inversion symmetric, can provide three-dimensional chirality, a subset of magnetoelectric coefficients.

From the material topology perspective, these metamaterial elements shown in FIG. 3 (302-330) can be either metallic lines on a dielectric substrate (or metallic particles embedded in a dielectric host), such as illustrations 302-322, or they can have the structure of a contiguous metallic layer with non-metallic voids, as illustrated by the element 324. The latter class of elements is also known as complementary metamaterial elements. In some embodiments the metamaterial element may be tunable, as described in U.S. Pat. No. 8,106,851 to Hyde et al., which is incorporated by reference herein.

FIG. 3 is meant to be illustrative of different kinds of elements that may be incorporated to produce a photonic crystal. There are many different elements that can produce an effective permeability, permittivity, and/or magnetoelectric susceptibilities, and those skilled in the art can select one or more metamaterial elements according to a particular embodiment. Further, although the term "metamaterial element" is used herein to describe an element that provides an effective permeability, permittivity, and/or magnetoelectric susceptibility when arranged in an array, other elements by other names that are also capable of producing an effective permeability, permittivity, and/or magnetoelectric susceptibility when arranged in an artificially structured array are also included as "metamaterial elements".

Figure 4:
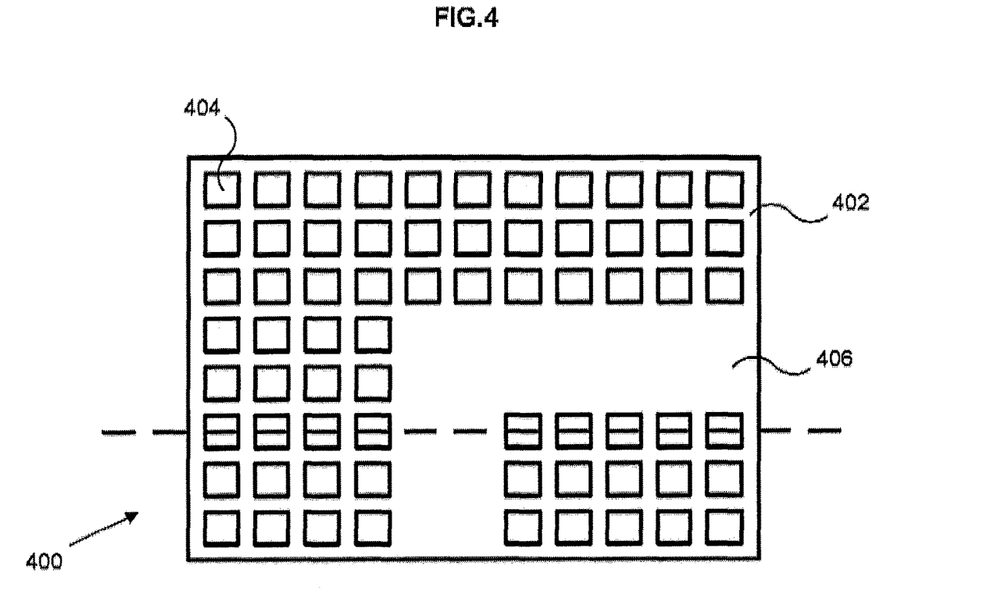
FIG. 4 shows a top view of a photonic band gap structure having a waveguide.

FIG. 4 shows a top view of a 2D photonic crystal 400 fabricated from a multilayer metamaterial 402. Such a multilayer metamaterial 402 is described in Larouche et al., "Infrared metamaterial phase holograms", Nature Materials, Volume 11, May 2012, p. 450-454, which is incorporated herein by reference and appended as Appendix A. A multilayer metamaterial such as is described in Larouche may be fabricated in an array of square pegs 404 to form a photonic crystal. In other embodiments, round (or a different shape) of pegs may be created to form the photonic crystal, or a solid slab of the multilayer metamaterial may be fabricated and an array of holes drilled into the slab to form the photonic crystal. There are many ways that the technology of Larouche may be configured such that the multilayer metamaterial is arranged to form a structure having a photonic band gap.

Figure 5:
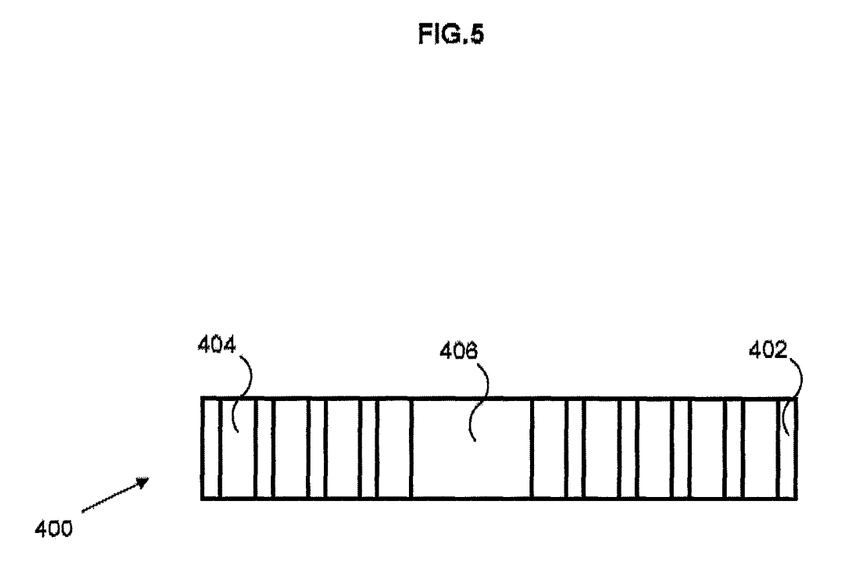
FIG. 5 shows a cross-sectional view of the photonic band gap structure of FIG. 4.

FIG. 5 shows a side cross-sectional view of the 2D photonic crystal 400 that is shown in FIG. 4, where the cross-section that is shown in FIG. 5 corresponds to the dashed line in FIG. 4.

In the embodiment shown in FIG. 4, the photonic crystal 400 is configured with a waveguide 406, where the waveguide 406 has a sharp 90 degree turn. Such a device may be used, for example, for connecting to an optical fiber to avoid losses that may occur at a bend in the fiber. Further, the band gap frequency range of the photonic crystal 400 can be engineered based on the desired operating frequency range of the waveguide 406. A 90 degree turn is just one example of the shape that a waveguide can take. For example, a waveguide can be 'Y' shaped in order to operate as a splitter, or it may be configured with more than two branches and an optical switch to operate as a router. There are many applications of photonic crystals, and a photonic crystal as described herein that incorporates an artificially structured array of elements can be designed for many different applications.

The foregoing detailed description has set forth various embodiments of devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

All of the above U.S. patents, U.S. patent application publications, U.S. patent applications, foreign patents, foreign patent applications and non-patent publications referred to in this specification and/or listed in any Application Data Sheet are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus comprising:
a structure including a first material, the first material including an artificially structured array of elements, the first material further being arranged in a pattern to at least partially form a photonic band gap in a band gap frequency range; and wherein:
the first material has an effective permeability or an effective permittivity in the band gap frequency range that is determined at least partially by the elements in the array;
the first material further being arranged in a pattern to at least partially form a photonic band gap includes a plurality of discrete portions of the first material, the discrete portions being arranged in a periodic lattice having a first lattice constant; and
the artificially structured array of elements includes a plurality of artificially structured sub-arrays of elements, each sub-array corresponding to one of the discrete portions of the first material, each sub-array having a second lattice constant that is small compared to the first lattice constant.

2. The apparatus of claim 1 wherein the array of elements include metamaterial elements, and the metamaterial elements include metal.

3. The apparatus of claim 1 wherein the array of elements include metamaterial elements, and the metamaterial elements include a resonant element.

4. The apparatus of claim 1 wherein the array of elements include metamaterial elements, and the metamaterial elements include a split ring resonator.

5. The apparatus of claim 1 wherein the array of elements include metamaterial elements, and the metamaterial elements include a conducting wire.

6. The apparatus of claim 1 wherein substantially all of the elements in the artificially structured array of elements are the same.

7. The apparatus of claim 1 wherein the structure further includes a second material arranged with the first material in the pattern to at least partially form the photonic band gap.

8. The apparatus of claim 7 wherein the second material includes a dielectric.

9. The apparatus of claim 1 wherein the array is an irregular array.

10. The apparatus of claim 1 wherein the elements in the array have an inter-element spacing that is substantially less than a free-space wavelength corresponding to a frequency in the band gap frequency range.

11. The apparatus of claim 10 wherein the inter-element spacing is less than one-fifth of a free-space wavelength corresponding to a frequency in the band gap frequency range.

12. The apparatus of claim 10 wherein the inter-element spacing is less than one-tenth of a free-space wavelength corresponding to a frequency in the band gap frequency range.

13. The apparatus of claim 1 wherein the band gap frequency range includes visible frequencies.

14. The apparatus of claim 1 wherein the structure includes a photonic crystal having the photonic band gap.

15. The apparatus of claim 1 wherein the array of elements includes one or more tunable elements.

16. The apparatus of claim 15 wherein the band gap frequency range is tunable responsive to the one or more tunable elements.

17. The apparatus of claim 1, wherein, within each sub-array, the elements have an inter-element spacing that is less than one-fifth of a free-space wavelength corresponding to a frequency in the band gap frequency range.

18. The apparatus of claim 1, wherein the first lattice constant is comparable to an operating wavelength of the apparatus.

19. The apparatus of claim 18, wherein the second lattice constant is about one-tenth to one-fifth of the operating wavelength of the apparatus.

20. An apparatus comprising:
an array of metamaterial elements arranged to form a photonic crystal, the photonic crystal having a band gap in a band gap frequency range;
wherein the photonic crystal includes a periodic lattice of unit cells having a first lattice constant, and the array of metamaterial elements includes, for each unit cell, a sub-array of metamaterial elements within the unit cell and having a second lattice constant that is small compared to the first lattice constant.

21. The apparatus of claim 20 wherein the photonic crystal is a 1D photonic crystal.

22. The apparatus of claim 20 wherein the photonic crystal is a 2D photonic crystal.

23. The apparatus of claim 20 wherein the photonic crystal is a 3D photonic crystal.

24. The apparatus of claim 20 wherein the array of metamaterial elements includes metal.

25. The apparatus of claim 20 wherein the array of metamaterial elements includes a split ring resonator.

26. The apparatus of claim 20 wherein the array of metamaterial elements includes a conducting wire.

27. The apparatus of claim 20 wherein the array of metamaterial elements is arranged to form a metamaterial, wherein the metamaterial is structured to form a photonic crystal.

28. The apparatus of claim 20 wherein substantially all of the metamaterial elements in the array of metamaterial elements are the same.

29. The apparatus of claim 20 wherein the array of metamaterial elements are characterized by an effective permeability.

30. The apparatus of claim 29 wherein the effective permeability is negative in at least a portion of the band gap frequency range.

31. The apparatus of claim 20 wherein the array of metamaterial elements are characterized by an effective permittivity.

32. The apparatus of claim 31 wherein the wherein the effective permittivity is negative in at least a portion of the band gap frequency range.

33. The apparatus of claim 20 wherein the array of metamaterial elements are characterized by an effective magnetoelectric susceptibility.

34. The apparatus of claim 20 wherein the array of metamaterial elements is arranged with a bulk material to form the photonic crystal.

35. The apparatus of claim 34 wherein the bulk material includes a dielectric.

36. The apparatus of claim 20 wherein the metamaterial elements are fabricated on a substrate and assembled to form the photonic crystal.

37. The apparatus of claim 36 wherein the substrate includes circuit board.

38. The apparatus of claim 20 wherein the metamaterial elements in the array have an inter-element spacing that is substantially less than a free-space wavelength corresponding to a frequency in the band gap frequency range.

39. The apparatus of claim 38 wherein the inter-element spacing is less than one-fifth of a free-space wavelength corresponding to a frequency in the band gap frequency range.

40. The apparatus of claim 38 wherein the inter-element spacing is less than one-tenth of a free-space wavelength corresponding to a frequency in the band gap frequency range.

41. The apparatus of claim 20 wherein the array of metamaterial elements includes one or more tunable metamaterial elements.

42. The apparatus of 29, wherein within each sub-array, the elements have an inter-element spacing that is less than one-fifth of a free-space wavelength corresponding to a frequency in the band gap frequency range.

43. The apparatus of claim 20, wherein the first lattice constant is comparable to an operating wavelength of the apparatus.

44. The apparatus of claim 20, wherein the second lattice constant is about one-tenth to one-fifth of the operating wavelength of the apparatus.

45. An apparatus comprising:
a structure including a first metamaterial, the first metamaterial including an artificially structured array of elements, the first metamaterial further being arranged in a pattern with a second material different from the first metamaterial to at least partially form a photonic band gap in a band gap frequency range; and wherein:
the first metamaterial has an effective permeability or an effective permittivity in the band gap frequency range that is determined at least partially by the elements in the array;
the first metamaterial further being arranged in a pattern to at least partially form a photonic band gap includes a plurality of discrete portions of the first material, the discrete portions being arranged in a periodic lattice having a first lattice constant; and
the artificially structured array of elements includes a plurality of artificially structured sub-arrays of elements, each sub-array corresponding to one of the discrete portions of the first metamaterial, each sub-array having a second lattice constant that is small compared to the first lattice constant.

46. The apparatus of claim 45 wherein the second material includes a second metamaterial.

47. The apparatus of claim 45 wherein the second material includes a bulk material.

48. The apparatus of claim 45 wherein the second material includes air.

49. The apparatus of claim 45, wherein, within each sub-array, the elements have an inter-element spacing that is less than one-fifth of a free-space wavelength corresponding to a frequency in the band gap frequency range.

50. The apparatus of claim 45, wherein the first lattice constant is comparable to an operating wavelength of the apparatus.

51. The apparatus of claim 50, wherein the second lattice constant is about one-tenth to one-fifth of the operating wavelength of the apparatus.

* * * * *

UNITED STATES PATENT AND TRADEMARK OFFICE
CERTIFICATE OF CORRECTION

PATENT NO.        : 9,759,839 B2                                    Page 1 of 1
APPLICATION NO.   : 14/306876
DATED             : September 12, 2017
INVENTOR(S)       : Roderick A. Hyde and Yaroslav A. Urzhumov It is certified that error appears in the above-identified patent and that said Letters Patent is hereby corrected as shown below:

In the Claims

Column 11, Line 13, Claim 42:
"The apparatus of 29, wherein" should read --The apparatus of 20, wherein--

Signed and Sealed this
Third Day of April, 2018

Andrei Iancu
*Director of the United States Patent and Trademark Office*